(12) United States Patent
Wang et al.

(10) Patent No.: US 10,723,823 B2
(45) Date of Patent: Jul. 28, 2020

(54) RESIN FORMULATION AND USES THEREOF

(71) Applicant: AGENCY FOR SCIENCE, TECHNOLOGY AND RESEARCH, Singapore (SG)

(72) Inventors: Fuke Wang, Singapore (SG); Fei Wang, Singapore (SG); Chaobin He, Singapore (SG); Yi Ting Chong, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 112 days.

(21) Appl. No.: 15/916,133

(22) Filed: Mar. 8, 2018

(65) Prior Publication Data

US 2018/0273657 A1 Sep. 27, 2018

(30) Foreign Application Priority Data

Mar. 8, 2017 (SG) .............................. 10201701897P

(51) Int. Cl.
| | | |
|---|---|---|
| *C08F 2/46* | (2006.01) | |
| *C08F 2/50* | (2006.01) | |
| *C08G 61/04* | (2006.01) | |
| *C08F 20/26* | (2006.01) | |
| *C08F 2/48* | (2006.01) | |
| *C08K 3/16* | (2006.01) | |
| *C08K 5/00* | (2006.01) | |
| *B33Y 10/00* | (2015.01) | |
| *C08F 220/18* | (2006.01) | |
| *C08F 222/10* | (2006.01) | |

(52) U.S. Cl.
CPC .............. *C08F 20/26* (2013.01); *B33Y 10/00* (2014.12); *C08F 2/48* (2013.01); *C08F 220/18* (2013.01); *C08F 222/1006* (2013.01); *C08K 3/16* (2013.01); *C08K 5/0041* (2013.01); *C08K 2003/168* (2013.01)

(58) Field of Classification Search
CPC ...... C08F 20/26; C08F 2/48; C08F 222/1006; C08F 220/18; C08F 2222/1013; C08F 2222/1026; C08K 2003/168; C08K 5/0041; C08K 3/16; B33Y 3/16
USPC .................................. 522/182, 178, 1; 520/1
See application file for complete search history.

(56) References Cited

U.S. PATENT DOCUMENTS

| | | | |
|---|---|---|---|
| 2003/0158284 A1* | 8/2003 | Zheng ............... | C08F 222/1006 522/75 |
| 2009/0190107 A1* | 7/2009 | Holt .................... | G03F 7/70291 355/44 |
| 2014/0106148 A1* | 4/2014 | Kanzler .................... | C08F 2/48 428/213 |

* cited by examiner

*Primary Examiner* — Jessica Whiteley
(74) *Attorney, Agent, or Firm* — Womble Bond Dickinson (US) LLP

(57) ABSTRACT

There is provided a resin formulation comprising a base acrylate monomer or oligomer, a solubilizing acrylate monomer or oligomer, a photoinitiator compound, a photoabsorber compound, and a photochromic dye, wherein the solubilizing acrylate monomer or oligomer comprises a functional group selected from the group consisting of hydroxyl, alkoxyl, carboxylic acid, amine, alkylamine, amide, alkylamide, alkylacrylate, acrylate, alkyl and heterocycloalkyl. There is also provided a method of preparing the resin formulation and uses of the resin formulation thereof.

14 Claims, 11 Drawing Sheets
(8 of 11 Drawing Sheet(s) Filed in Color)

RESIN FORMULATION AND USES THEREOF

CROSS-REFERENCE TO RELATED APPLICATION

This application claims priority to Singapore application number 10201701897P filed on 8 Mar. 2017, the disclosure of which is hereby incorporated by reference.

TECHNICAL FIELD

The present invention generally relates to a resin formulation and the uses thereof. The present invention also relates to a method of preparing a resin formulation.

BACKGROUND ART

Three-dimensional (3D) printing, also known as additive manufacturing, refers to the technology used for the rapid production of 3D objects directly from digital designs. With the unique ability to create complicated 3D objects in a fast yet accurate manner, 3D printing technology is now widely used not just in industries, but also in households as well.

Among the different 3D printing processes, Stereolithography (SLA) and Digital Light Processing (DLP) techniques feature the use of a liquid photopolymer which is solidified during the printing process to form a solid 3D printed object. However, these techniques can only print single color structures, which limit their applications when different colors or patterns are required to be printed on the 3D structures. Further, these 3D printing techniques produce printed articles with limited thickness and are also limited by the range of compatible materials. There is therefore a demand for a wider range of 3D printable resins or materials which can display dynamic colour changes.

There is a need to provide a resin formulation that overcomes, or at least ameliorates, one or more of the disadvantages described above.

There is a need to provide a method of adjusting a colour of a three-dimensional printed article that overcomes, or at least ameliorates, one or more of the disadvantages described above.

SUMMARY OF INVENTION

According to a first aspect, there is provided a resin formulation comprising:
a) a base acrylate monomer or oligomer;
b) a solubilizing acrylate monomer or oligomer comprising a functional group selected from the group consisting of alkyl, hydroxyl, alkoxyl, carboxylic acid, amine, alkylamine, amide, alkylamide, alkylacrylate, acrylate and heterocycloalkyl;
c) a photoinitiator compound;
d) a photoabsorber compound; and
e) a photochromic dye.

According to a second aspect, there is provided a method of preparing a resin formulation as defined herein, comprising the step of stirring a base acrylate monomer, a solubilizing acrylate monomer, a photoinitiator compound, a photoabsorber compound and a photochromic dye in the absence of light for a period of time to form a reaction mixture; and optionally ultrasonicating the reaction mixture.

According to a third aspect, there is provided a use of the resin formulation as defined herein as a material for three-dimensional printing.

According to a fourth aspect, there is provided a method for producing a three-dimensional photochromic object comprising exposing the resin formulation as defined herein to a light source.

According to a fifth aspect, there is provided a three-dimensional printed article comprising the resin formulation as defined herein, wherein said resin formulation is in a cured state.

According to a sixth aspect, there is provided a method of tuning a colour of a three-dimensional printed article comprising exposing a portion of the three-dimensional printed article as defined herein with photo-irradiation.

Advantageously, the resin formulation of the present disclosure may achieve superior quality of the resulting 3D print and may also improve the visibility of the change of color for the 3D print.

Further advantageously, the inclusion of a photochromic dye may enable the resin formulation to obtain dynamic colour change properties. More advantageously, the inclusion of a photochromic dye in the resin formulation may enable the resulting 3D printed articles to be capable of changing their colours when exposed to photo-irradiation.

Definitions

The following are some definitions that may be helpful in understanding the description of the present invention. These are intended as general definitions and should in no way limit the scope of the present invention to those terms alone, but are put forth for a better understanding of the following description.

The term "photochromic" is to be interpreted broadly to mean having an absorption spectrum for at least visible radiation that varies in response to absorption of at least actinic radiation.

The term "colouration" or "colouring" as used herein refers to the change in colour from the original colour to its activated colour. The colour change may be, but not limited to, a colour change from a light colour tone to a dark colour tone.

The term "de-colouration" or de-colouring" as used herein refers to the change in colour from the activated colour to its original colour. The colour change may be, but not limited to, a colour change from a dark colour tone to a light colour tone.

The term "luminescence" or "fluorescence" as used herein refers to the emission of light by a substrate or a substance that has not been heated, as in fluorescence and phosphorescence.

The term "resin formulation" is to be interpreted broadly to include a material or a mixture prepared according to a formula comprising a synthetic organic polymer. The resin formulation may be used as a material for 3D printing where the resin formulation forms a printed object when exposed to a curing agent such as light or heat.

The term "solubilizing acrylate" as used herein refers to an acrylate compound that acts as an additive to improve the miscibility of components in a resin formulation.

The term "photoabsorber" or "photostabilizer" as used herein refers to a substrate or a substance to control the curing depth during the 3D printing process.

The term "photoinitiator" as used herein refers to a compound that undergoes a photoreaction on absorption of light, producing reactive species. Such compounds are capable of initiating or catalyzing chemical reactions that may result in significant changes in the solubility and physical properties of suitable formulations.

As used herein, the term "alkyl group" includes within its meaning monovalent ("alkyl") and divalent ("alkylene") straight chain or branched chain saturated aliphatic groups having from 1 to 10 carbon atoms, eg, 1, 2, 3, 4, 5, 6, 7, 8, 9, or 10 carbon atoms. For example, the term alkyl includes, but is not limited to, methyl, ethyl, 1-propyl, isopropyl, 1-butyl, 2-butyl, isobutyl, tert-butyl, amyl, 1,2-dimethylpropyl, 1,1-dimethylpropyl, pentyl, isopentyl, hexyl, 4-methylpentyl, 1-methylpentyl, 2-methylpentyl, 3-methylpentyl, 2,2-dimethylbutyl, 3,3-dimethylbutyl, 1,2-dimethylbutyl, 1,3-dimethylbutyl, 1,2,2-trimethylpropyl, 1,1,2-trimethylpropyl, 2-ethylpentyl, 3-ethylpentyl, heptyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethylpentyl, 1,2,3-trimethylbutyl, 1,1,2-trimethylbutyl, 1,1,3-trimethylbutyl, 5-methylheptyl, 1-methylheptyl, octyl, nonyl, decyl, and the like.

The term "heterocyclic" or "heterocyclyl" refers to a saturated, partially unsaturated or fully unsaturated monocyclic, bicyclic or polycyclic ring system containing at least one heteroatom selected from the group consisting of nitrogen, sulfur and oxygen as a ring atom. Examples of heterocyclic moieties include heterocycloalkyl, heterocycloalkenyl and heteroaryl.

The term "cycloalkyl" as used herein refers to cyclic saturated aliphatic groups and includes within its meaning monovalent ("cycloalkyl"), and divalent ("cycloalkylene"), saturated, monocyclic, bicyclic, polycyclic or fused polycyclic hydrocarbon radicals having from 3 to 10 carbon atoms, eg, 3, 4, 5, 6, 7, 8, 9, or 10 carbon atoms. Examples of cycloalkyl groups include but are not limited to cyclopropyl, 2-methylcyclopropyl, cyclobutyl, cyclopentyl, 2-methylcyclopentyl, 3-methylcyclopentyl, cyclohexyl, and the like.

The term "heterocycloalkyl" refers to a saturated monocyclic, fused or bridged or spiro polycyclic ring containing at least one heteroatom selected from nitrogen, sulfur, oxygen, preferably from 1 to 3 heteroatoms in at least one ring. Each ring is preferably from 3 to 10 membered, more preferably 4 to 7 membered. Exemplary heterocycloalkyl substituents include pyrrolidinyl, piperidinyl, azepanyl, piperazinyl, dioxanyl, morpholinyl, pyrazolinidyl, morpholinyl, thiomorpholinyl, tetrahydropyridinyl, tetrahydropyrazolopyridine, oxotetrahydroquinolinyl, azabicyloheptanyl, azabicyclooctanyl, azaspirocyclooctanyl or dioxaazaspirodecanyl. A heterocycloalkyl group typically is a $C_2$-$C_{12}$ heterocycloalkyl group. A heterocycloalkyl group may comprise 3 to 9 ring atoms. A heterocycloalkyl group may comprise 1 to 3 heteroatoms independently selected from the group consisting of N, O and S. The group may be a terminal group or a bridging group.

The term "acrylate" refers to a salt, ester, and conjugate base of acrylic acid and its derivatives. Acrylate contains vinyl groups, that is, two carbon atoms double bonded to each other, directly attached to the carbonyl carbon. Exemplary acrylates include, but are not limited to, methyl acrylate, acrylic acid and methacrylate. The group may be a terminal group.

The term "alkyl acrylate" refers to a combination of the definitions of alkyl and acrylate as defined herein, such as alkyl-acrylate or acrylate-alkyl. The group may be a terminal group or a bridging group.

The term "aryl" refers to a carbocyclic (consisting entirely of carbon and hydrogen) aromatic group or a heterocyclic aromatic group. Exemplary aryls include, but are not limited to, phenyl, naphthyl, indenyl, indanyl, azulenyl, fluorenyl, anthracenyl, furyl, thienyl, pyridyl, pyrrolyl, oxazolyly, thiazolyl, imidazolyl, pyrazolyl, 2-pyrazolinyl, pyrazolidinyl, isoxazolyl, isothiazolyl, 1,2,3-oxadiazolyl, 1,2,3-triazolyl, 1,3,4-thiadiazolyl, pyridazinyl, pyrimidinyl, pyrazinyl, 1,3,5-triazinyl, 1,3,5-trithianyl, indolizinyl, indolyl, isoindolyl, 3H-indolyl, indolinyl, benzo[b]furanyl, 2,3-dihydrobenzofuranyl, benzo[b]thiophenyl, 1H-indazolyl, benzimidazolyl, benzthiazolyl, purinyl, 4H-quinolizinyl, quinolinyl, isoquinolinyl, cinnolinyl, phthalazinyl, quinazolinyl, quinoxalinyl, 1,8-naphthyridinyl, pteridinyl, carbazolyl, acridinyl, phenazinyl, phenothiazinyl, and phenoxazinyl.

The term "arylalkyl" means an aryl-alkyl-group in which the aryl and alkyl moieties are as defined herein. Exemplary arylalkyl groups include benzyl, phenethyl, 1-naphthalenemethyl and 2-naphthalenemethyl. The group may be a terminal group or a bridging group. If the group is a terminal group it is bonded to the remainder of the molecule through the alkyl group.

The term "alkoxyl" as used herein refers to straight chain or branched alkyl-oxy groups. Examples include ethoxy, n-propoxy, isopropoxy, tert-butoxy, and the like.

The term "arylalkoxyl" means an aryl-alkyl-O— group in which the alkyl and aryl are as defined herein. The group may be a terminal group or a bridging group. If the group is a terminal group it is bonded to the remainder of the molecule through the oxygen atom.

The term "alkylamine" or "Alkylamino" includes both mono-alkylamino and dialkylamino, unless specified. "Mono-alkylamino" means a Alkyl-NH— group, in which alkyl is as defined herein. "Dialkylamino" means a (alkyl)$_2$N— group, in which each alkyl may be the same or different and are each as defined herein for alkyl. The group may be a terminal group or a bridging group. If the group is a terminal group it is bonded to the remainder of the molecule through the nitrogen atom.

The term "arylalkylamine" as used herein refers to an amine containing a saturated or unsaturated hydrocarbon chain. A primary arylalkylamine is composed of a ring of 6 to 10 carbon atoms. Exemplary arylalkylamines include but are not limited to phenyl, tolyl, alkoxyphenyl, alkoxycarbonylphenyl, and halophenyl. The term "aryl" as used herein, is phenyl, 1-naphthyl, and 2-naphthyl. The term "substituted aryl" as used herein, is phenyl, 1-naphthyl and 2-naphthyl having a substituent selected from the group consisting of phenyl, heteroaryl, lower alkyl, lower alkoxy, lower alkylthio, halo, hydroxy, trifluoromethyl, amino, —NH(lower alkyl), and —N(lower alkyl)$_2$, as well as being mono-, di- and tri-substituted phenyl, 1-naphthyl, and 2-naphthyl containing substituents selected from methyl, methoxy, methylthio, halo, hydroxy, and amino.

The term "alkylsilane" as used herein refers to an alkylsilane group with at least one silicon carbon bond (e.g., Si—CH$_3$) in which the alkyl is as defined herein.

The term "arylalkylsilane" as used herein refers to an aryl-alkylsilane group in which the aryl and alkylsilane moieties are as defined herein.

The term "alkylcarboxylic acid" refers to a branched or linear alkyl group wherein at least one termini is substituted with a —COOH group.

The term "arylalkylcarboxylic acid" as used herein refers to an aryl-alkylcarboxylic acid group in which the aryl and alkylcarboxylic acid moieties are as defined herein.

The term "ester" as used herein may refer to compounds having the general formula: $R^a$—COO—$R^b$, wherein $R^a$ and $R^b$ denote any organic compound (such as alkyl, aryl, or silyl groups), including those bearing heteroatom containing substituent groups.

The term "carbonyl" refers to moieties possessing an aldehyde (RCHO) or a ketone (RCOR).

The term "alkylether" means an alkyl-O-alkyl group in which the alkyl is as defined herein.

The term "alkylester" means an alkyl-ester-alkyl group in which the alkyl and ester are as defined herein.

The term "alkyletheraryl" means an alkyl-O-aryl or an aryl-O-alkyl group in which the aryl and alkyl are as defined herein.

The term "arylalkylether" means an aryl-O-alkyl group in which the aryl and alkyl are as defined herein.

The term "optionally substituted" as used herein means the group to which this term refers may be unsubstituted, or may be substituted with one or more groups independently selected from alkyl, hydroxyalkyl, aminoalkyl, alkenyl, cycloalkyl, cycloalkenyl, —COOH, alkoxycarbonyl, hydroxyl (OH), alkoxy, alkoxyalkyl, five to six membered optionally benzo-fused heterocycloalkyl having 1 to 3 hetero atoms selected from N, O or S, C6 or C10-aryl, aryl having 6 to 10 carbon atoms, five to six ring membered optionally benzo-fused heteroaryl having 1 to 3 hetero atoms selected from N, O or S, C1-C4-alkylaryl having 6 or 10 carbon atoms in the aryl, five to six ring membered optionally benzo-fused C1-C6-alkylheteroaryl having 1 to 3 hetero atoms selected from N, O or S, pyrazolyl, imidazolyl, pyrazinyl, piperazinyl or piperidinyl; preferably, when this term is unsubstituted, the functional group may be hydrogen.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and sub-generic groupings falling within the generic disclosure also form part of the disclosure. This includes the generic description of the embodiments with a proviso or negative limitation removing any subject matter from the genus, regardless of whether or not the excised material is specifically recited herein.

DETAILED DISCLOSURE OF EMBODIMENTS

Exemplary, non-limiting embodiments of a resin formulation will now be disclosed.

The resin formulation may comprise a base acrylate monomer or oligomer, a solubilizing acrylate monomer or oligomer comprising a functional group selected from the group consisting of alkyl, hydroxyl, alkoxyl, carboxylic acid, amine, alkylamine, amide, alkylamide, alkylacrylate, acrylate and heterocycloalkyl, a photoinitiator compound, a photoabsorber compound, and a photochromic dye. The resin formulation may consist essentially of a base acrylate monomer or oligomer, a solubilizing acrylate monomer or oligomer, a photoinitiator compound, a photoabsorber compound, and a photochromic dye. The resin formulation may consist of a base acrylate monomer or oligomer, a solubilizing acrylate monomer or oligomer, a photoinitiator compound, a photoabsorber compound, and a photochromic dye.

The base acrylate may comprise at least one acrylate functional group. The base acrylate may comprise two or more acrylate functional groups. Advantageously, the presence of two or more acrylate functional groups may decrease the viscosity of the resin formulation and thus increase the polymerization rate during 3D printing. Further advantageously, the presence of two or more acrylate functional groups may enhance the thermal resistance and mechanical strength of the printed 3D object.

The base acrylate of the resin formulation may be a monomer or an oligomer. The base acrylate monomer or oligomer may be a multifunctional or monofunctional acrylate monomer or oligomer. The base acrylate monomer or oligomer may be an aliphatic acrylate monomer or oligomer.

The base acrylate monomer may be of formula (Ia), (Ib), (Ic) or (Id):

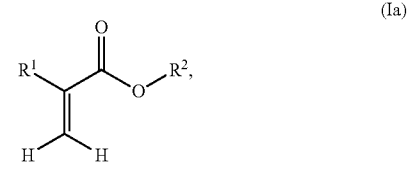

(Ia)

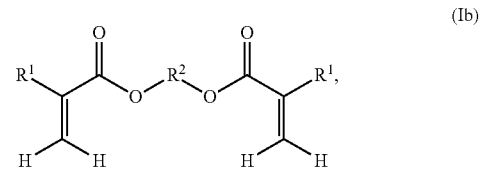

(Ib)

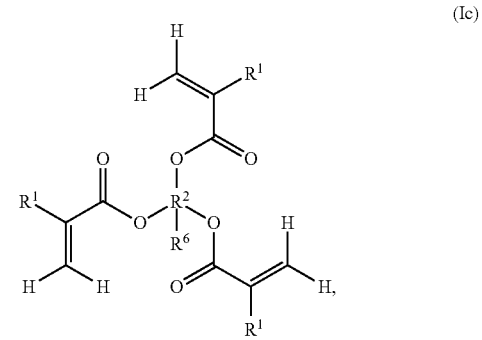

(Ic)

-continued

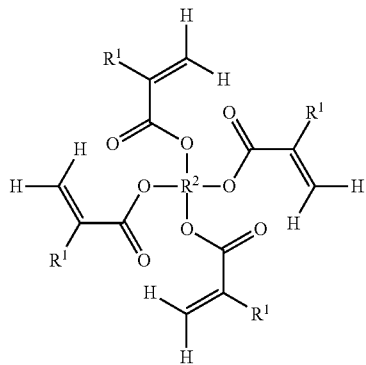
(Id)

wherein
$R^1$ may be hydrogen or an alkyl group;
$R^2$ in formula (Ia), (Ib) or (Ic) may be independently an optionally substituted alkyl group, an optionally substituted arylalkyl group, an optionally substituted alkoxyl group, an optionally substituted arylalkoxyl group, an optionally substituted alkylamine group, an optionally substituted arylalkylamine group, an optionally substituted alkylsilane group, an optionally substituted arylalkylsilane group, an optionally substituted alkylcarboxylic acid group, an optionally substituted arylalkylcarboxylic acid group, an optionally substituted ester group, an optionally substituted carbonyl group, an optionally substituted alkylether group, an optionally substituted cycloalkyl group, or an optionally substituted arylalkylether group;
$R^2$ in formula (Id) may be a carbon atom or an optionally substituted alkyl group; or
$R^6$ in formula (Ic) may be hydrogen or a hydroxyl group.

The base acrylate monomer may be a mono-acrylate, a di-acrylate, a tri-acrylate, or a tetra-acrylate. The base acrylate monomer may be selected from the group consisting of poly(ethylene glycol) diacrylate, di(ethylene glycol) diacrylate, tri(ethylene glycol) diacrylate, tetra(ethylene glycol) diacrylate, di(ethylene glycol) dimethacrylate, 1,3-Butanediol diacrylate, 1,6-Hexanediol diacrylate, Bisphenol A ethoxylate diacrylate, Trimethylolpropane triacrylate, Pentaerythritol triacrylate, Di(trimethylolpropane) tetraacrylate, and Pentaerythritol tetraacrylate.

Where the base acrylate may be an oligomer, the oligomer may be made up of a plurality of base acrylate monomers, each monomer being of the same general formula (Ia), (Ib), (Ic), or (Id) but may have the same or different $R^2$ substituent group therein. The $R^2$ substituent group may be as defined above. The oligomer may be made up of a plurality of base acrylate monomers, each monomer being of a different general formula (Ia), (Ib), (Ic), or (Id) with each formula having the same or different $R^2$ substituent group therein.

The weight percentage of the base acrylate monomer or oligomer of the resin formulation may be about 70 to about 90 wt %, or about 75 to about 90 wt %, or about 80 to about 90 wt %, or about 85 to about 90 wt %, or about 70 to about 85 wt %, or about 70 to about 80 wt %, or about 70 to about 75 wt %, or about 80 to about 85 wt %, based on the total weight of the resin formulation.

The solubilizing acrylate may comprise a functional group selected from the group consisting of hydroxyl, alkoxyl, carboxylic acid, amine, alkylamine, amide, alkylamide, alkylacrylate, acrylate, alkyl and heterocycloalkyl.

The solubilizing acrylate may be a solubilizing acrylate monomer or oligomer. The solubilizing acrylate monomer may be of formula (II):

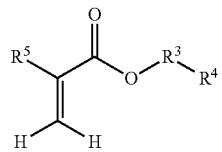
(II)

wherein
$R^3$ may be independently an optionally substituted alkyl group, an optionally substituted arylalkyl group, an optionally substituted alkoxyl group, an optionally substituted arylalkoxyl group, an optionally substituted alkylamine group, an optionally substituted arylalkylamine group, an optionally substituted alkylsilane group, an optionally substituted arylalkylsilane group, an optionally substituted alkylcarboxylic acid group, an optionally substituted arylalkylcarboxylic acid group, an optionally substituted ester group, an optionally substituted alkylacrylate group, an optionally substituted acrylate group, an optionally substituted alkylester group, an optionally substituted arylalkylester group, an optionally substituted carbonyl group, an optionally substituted alkylether group, an optionally substituted cycloalkyl group, or an optionally substituted arylalkylether group;
$R^4$ may be selected from the group consisting of alkyl, hydroxyl, alkoxyl, carboxylic acid, amine, alkylamine, amide, alkylamide, alkylacrylate, acrylate and heterocycloalkyl; and
$R^5$ may be hydrogen or an alkyl group.

The solubilizing acrylate monomer may be selected from the group consisting of 2-carboxyethyl acrylate, 3-carboxypropyl acrylate, 4-carboxybutyl acrylate, 1,3-propanediol diacrylate, 1,4-butanediol diacrylate, 1,5-pentanediol diacrylate, tetrahydrofurfuryl methacrylate, 2-tetrahydropyranyl acrylate, 2-[[(Butylamino)carbonyl]oxy]ethyl acrylate, 4-tert-Butylcyclohexyl methacrylate, Ethyl triglycol methacrylate, and 3,3,5-trimethylcyclohexanol methacrylate.

Where the solubilizing acrylate may be an oligomer, the oligomer may comprise of one $R^3$ group or a plurality of $R^3$ of the same substituents or different substituents, or one $R^4$ group or a plurality of $R^4$ of the same substituents or different substituents independently in the general Formula (II) above. The solubilizing acrylate may be an oligomer, the oligomer may comprise of one $R^3$ group or a plurality of $R^3$ of the same substituents or different substituents, and one $R^4$ group or a plurality of $R^4$ of the same substituents or different substituents independently in the general Formula (II) above.

The weight percentage of the solubilizing acrylate monomer or oligomer may be about 9.8 to about 20 wt %, or about 10 to about 20 wt %, or about 12 to about 20 wt %, or about 14 to about 20 wt %, or about 16 to about 20 wt %, or about 18 to about 20 wt %, or about 9.8 to about 18 wt %, or about 9.8 to about 16 wt %, or about 9.8 to about 14 wt %, or about 9.8 to about 12 wt %, or about 14 to about 15 wt % based on the total weight of the resin formulation.

Advantageously, the solubilizing acrylate may improve the solubility and miscibility as well as enhance the homogenous dispersion of the photoabsorber compound and photochromic dye in the resin formulation. More advantageously, the inclusion of the solubilizing acrylate as a component in the resin formulation may enhance the incorporation of the photochromic dyes into the resin formulation through non-covalent bonds. For example, the solubilizing acrylate monomer may be selected based on "like dissolves like" principle, wherein if the photochromic dye is structurally polar, the solubilizing acrylate monomer having polar functional groups like hydroxyl and carboxylic acid may be selected for the particular reaction and vice versa where the nonpolar photochromic dye will require a nonpolar solubilizing acrylate monomer. Further advantageously, the presence of the solubilizing acrylate may decrease the viscosity may decrease the viscosity, thereby increasing the solidification rate of the resin formulation during 3D printing.

The photoinitiator may be a cationic, anionic or neutral species initiator. The photoinitiator may be selected from the group consisting of Phenylbis(2,4,6-trimethylbenzoyl)phosphine oxide (IRGACURE 819), benzoyl-diphenylphosphine oxide (BDPO), 2,4,6-trimethylbenzoyl-methoxy-phenylphosphine oxide (TMMPO), 2,4,6-trimethylbenzoyldiphenyl phosphine (TPO), 2-hydroxy-2-methyl-1-phenyl-1-propane (DAROCUR 1173), benzophenone (BP), 4,4'-bis(diethylamino)benzophenone, phenanthrenequinone, 2-chlorothioxanthen-9-one, 4,4'-bis(dimethylamino)-benzophenone, diphenyliodonium hexafluorophosphate, (4-tert-butylphenyl)diphenylsulfonium triflate, diphenyliodonium nitrate, diphenyliodonium p-toluenesulfonate, (4-fluorophenyl)diphenylsulfonium triflate, triphenylsulfonium triflate and bis(4-tert-butylphenyl)iodonium trifluoromethanesulfonate (DtBPIT). Advantageously, the photoinitiator may generate radicals when exposure to a light source to initiate crosslinking reaction of the base acrylate monomer or oligomers.

The weight percentage of the photoinitiator may be about 0.1 to about 5.0 wt %, or about 0.2 to about 5.0 wt %, or about 0.3 to about 5.0 wt %, or about 0.4 to about 5.0 wt %, or about 0.5 to about 5.0 wt %, or about 0.6 to about 5.0 wt %, or about 0.7 to about 5.0 wt %, or about 0.8 to about 5.0 wt %, or about 0.9 to about 5.0 wt %, or about 1.0 to about 5.0 wt %, or about 2.0 to about 5.0 wt %, or about 3.0 to about 5.0 wt %, or about 4.0 to about 5.0 wt %, or about 0.1 to about 4.0 wt %, or about 0.1 to about 3.0 wt %, or about 0.1 to about 2.0 wt %, or about 0.1 to about 1.0 wt %, or about 0.1 to about 0.9 wt %, or about 0.1 to about 0.8 wt %, or about 0.1 to about 0.7 wt %, or about 0.1 to about 0.6 wt %, or about 0.1 to about 0.5 wt %, or about 0.1 to about 0.4 wt %, or about 0.1 to about 0.3 wt %, or about 0.1 to about 0.2 wt %, or about 0.4 to about 0.5 wt % based on the total weight of the resin formulation.

The photoabsorber compound may be selected from the group consisting of 1-phenylazo-2-naphthol (sudan I), 1-(2,4-dimethylphenylazo)-2-naphthol (sudan II), 1-(4-(phenyldiazenyl)phenyl) azonaphthalen-2-ol (sudan III), 1-[{2-methyl-4-[(2-methylphenyl)diazenyl]phenyl}diazenyl] naphthalen-2-ol (sudan IV), 2,5-bis(5-tert-butyl-benzoxazol-2-yl)thiophene, 4-methoxyphenol and butylatedhydroxytoluene, Fluorescein, Poly(3-hexylthiophene-2,5-diyl), oligothiophenes, tri-phenylamines, diketopyrrolopyrroles derivatives, 2,5-Dihydro-3,6-di-2-thienyl-pyrrolo[3,4-c]pyrrole-1,4-dione, borondipyrromethenes derivatives, 1,3,5,7-Tetramethyl-8-phenyl-4,4-difluoroboradiazaindacene, 2,2'-(2,5-thiophenediyl)bis(5-tert-butylbenzoxazole), (±)-α-Tocopherol, 2-Phenyl-2H-benzotriazole derivatives, and indigo dye. Advantageously, the presence of a photoabsorber compound may help to control the curing depth of the resin formulation during 3D printing, and may produce more accurate 3D prints.

The weight percentage of the photoabsorber compound may be about 0.01 to about 0.5 wt %, or about 0.02 to about 0.5 wt %, or about 0.03 to about 0.5 wt %, or about 0.04 to about 0.5 wt %, or about 0.05 to about 0.5 wt %, or about 0.06 to about 0.5 wt %, or about 0.07 to about 0.5 wt %, or about 0.08 to about 0.5 wt %, or about 0.09 to about 0.5 wt %, or about 0.1 to about 0.5 wt %, or about 0.2 to about 0.5 wt %, or about 0.3 to about 0.5 wt %, or about 0.4 to about 0.5 wt %, or about 0.01 to about 0.4 wt %, or about 0.01 to about 0.3 wt %, or about 0.01 to about 0.2 wt %, or about 0.01 to about 0.1 wt %, or about 0.01 to about 0.09 wt %, or about 0.01 to about 0.08 wt %, or about 0.01 to about 0.07 wt %, or about 0.01 to about 0.06 wt %, or about 0.01 to about 0.05 wt %, or about 0.01 to about 0.04 wt %, or about 0.01 to about 0.03 wt %, or about 0.01 to about 0.02 wt % based on the total weight of the resin formulation. The weight percentage of the photoabsorber compound to be loaded into the resin formulation may depend on several factors such as the light source of the printer (e.g. wavelength, density, etc.), suitability of the photoabsorber compound and other components of the resin formulation. On the other hand, excessive or insufficient loading of the components may result in overly cured or insufficiently cured 3D prints. Furthermore, selection of photoabsorber compounds such as Sudan I may cause the resulting 3D printed article to display a deep orange colour, rendering it difficult to monitor any subsequent colour changes during photo-irradiation. Advantageously, optimal selection and loading of the photoabsorber and photoinitiator compounds may provide the resin formulation with a light colored or colorless appearance to enable excellent visibility of color changes during photo-irradiation. More advantageously, an optimal loading of the photoinitiator compound, the photoabsorber compound and the photochromic dye into the resin formulation may enable optimal curing of the 3D print, resulting in the best possible strength and stability of the 3D printed object.

The photochromic dye may be a photochromic compound. The photochromic dye may undergo a reversible reaction under photo-irradiation. During photochromic reaction, the visible light absorption spectrum of a substance may be changed considerably and reversibly as it is exposed under activating radiation. The substance can be restored to its original state through an opposite colour change mechanism by heating, placing in dark or being irradiated by light having different wavelength. Any photochemical reaction type may be used to produce photochromic effects with appropriate molecular design. Examples of photochromic reactions may involve pericyclic reactions, cis-trans isomerizations, intramolecular hydrogen transfer, intramolecular group transfers, dissociation processes and electron transfers (oxidation-reduction).

The photochromic dye may comprise an organic dye, an inorganic compound or a combination thereof.

The inorganic compound may be selected from the group consisting of silver chloride, zinc halides and yttrium hydride.

The organic dye is selected from the group consisting of Spiropyrans, spirooxazines, 1',3'-Dihydro-1',3',3'-trimethyl-6-nitrospiro[2H-1-benzopyran-2,2'-(2H)-indole], 1-(2-Hydroxyethyl)-3,3-dimethylindolino-6'-nitrobenzopyryrospiran, 1,3,3-Trimethylindolinobenzopyrylospiran, 1,3,3-Trimethylindolino-6'-nitrobenzopyrylospiran, 1,3,3-Trimethylindolino-6'-bromobenzopyrylospiran, 1,3,3-Trimethylindolino-8'-methoxybenzopyrylospiran, 1,3,3-Trimethylindolino-β-naphthopyrylospiran, 1,3,3-Trimethylindolinonaphthospirooxazine, diarylethenes, 2,3-

Bis(2,4,5-trimethyl-3-thienyl)maleic Anhydride, 2,3-Bis(2, 4,5-trimethyl-3-thienyl)maleimide, cis-1,2-Dicyano-1,2-bis (2,4,5-trimethyl-3-thienyl)ethene, 1,2-Bis[2-methylbenzo [b]thiophen-3-yl]-3,3,4,4,5,5-hexafluoro-1-cyclopentene, 1,2-Bis(2,4-dimethyl-5-phenyl-3-thienyl)-3,3,4,4,5,5-hexafluoro-1-cyclopentene, spiroperimidines, 2,3-Dihydro-2-spiro-4'-[8'-aminonaphthalen-1'(4'H)-one]perimidine, 2,3-Dihydro-2-spiro-7'-[8'-imino-7',8'-dihydronaphthalen-1'-amine]perimidine; (E)-3-(Adamantan-2-ylidene)-4-[1-(2,5-dimethyl-3-furyl)ethylidene]dihydro-2,5-furandione (Aberchrome 670), 2,2'-Bis(2-chlorophenyl)-4,4',5,5'-tetraphenyl-1,2'-biimidazole, 4-[Bis(9,9-dimethylfluoren-2-yl) amino]azobenzene, 1,1'-Dibenzyl-4,4'-bipyridinium dichloride, 4,4'-Dipyridyl.

Advantageously, presence of the photochromic dye may enable controlled colour changes of the resin formulation and 3D print under photo-irradiation. The speed of coloring and de-coloring of the photochromic dyes may be controlled by the polarity of polymer matrix and interaction of polymer matrix with photochromic dyes.

The weight percentage of the photochromic dye may be about 0.09 to about 4.5 wt %, or about 0.1 to about 4.5 wt %, or about 0.2 to about 4.95 wt %, or about 0.4 to about 4.95 wt %, or about 0.6 to about 4.5 wt %, or about 0.8 to about 4.5 wt %, or about 1.0 to about 4.5 wt %, or about 2.0 to about 4.5 wt %, or about 3.0 to about 4.5 wt %, or about 4.0 to about 4.5 wt %, or about 0.09 to about 4.0 wt %, or about 0.09 to about 3.0 wt %, or about 0.09 to about 2.0 wt %, or about 0.09 to about 1.0 wt %, or about 0.09 to about 0.8 wt %, or about 0.09 to about 0.6 wt %, or about 0.09 to about 0.4 wt %, or about 0.09 to about 0.2 wt %, or about 0.09 to about 0.1 wt % based on the total weight of the resin formulation.

The resin formulation may comprise about 70 to about 90 wt % of the base acrylate monomer, about 9.8 to about 20 wt % of the solubilizing acrylate monomer, about 0.1 to about 5 wt % of the photoinitiator, about 0.01 to about 0.5 wt % of the photoabsorber compound, and about 0.09 to about 4.5 wt % of the photochromic dye based on the total weight of the resin formulation.

Exemplary, non-limiting embodiments of a method of preparing a resin formulation will now be disclosed. The method may comprise the step of stirring a base acrylate monomer, a solubilizing acrylate monomer, a photoinitiator compound, a photoabsorber compound and a photochromic dye in the absence of light for a period of time to form a reaction mixture; and optionally ultrasonicating the reaction mixture.

The method of preparing the resin formulation may comprise the addition of the base acrylate, the solubilizing acrylate, the photoinitiator compound, the photoabsorber compound and the photochromic dye into a reaction vessel in a sequential order.

The reaction mixture may be stirred for about 8 to about 24 hours, or about 8 to about 23 hours, or about 8 to about 22 hours, or about 8 to about 21 hours, or about 8 to about 20 hours, or about 8 to about 19 hours, or about 8 to about 18 hours, or about 8 to about 17 hours, or about 8 to about 16 hours, or about 8 to about 15 hours, or about 8 to about 14 hours, or about 8 to about 13 hours, or about 8 to about 12 hours, or about 8 to about 11 hours, or about 8 to about 10 hours, or about 8 to about 9 hours, or about 9 to about 24 hours, or about 10 to about 24 hours, or about 11 to about 24 hours, or about 12 to about 24 hours, or about 13 to about 24 hours, or about 14 to about 24 hours, or about 15 to about 24 hours, or about 16 to about 24 hours, or about 17 to about 24 hours, or about 18 to about 24 hours, or about 19 to about 24 hours, or about 20 to about 24 hours, or about 21 to about 24 hours, or about 22 to about 24 hours, or about 23 to about 24 hours.

The reaction mixture may be stirred at a temperature in the range of about 20 to about 28° C., or about 20 to about 27° C., or about 20 to about 26° C., or about 20 to about 25° C., or about 20 to about 24° C., or about 20 to about 23° C., or about 20 to about 22° C., or about 20 to about 21° C., or about 21 to about 28° C., or about 22 to about 28° C., or about 23 to about 28° C., or about 24 to about 28° C., or about 25 to about 28° C., or about 26 to about 28° C., or about 27 to about 28° C., or preferably at room temperature.

Exemplary, non-limiting embodiments of a method of printing a three-dimensional photochromic object will now be disclosed. The method of printing the luminescent object comprises the step of exposing the resin formulation as defined above to a light source.

The light source may be selected from the group consisting of visible light, infra-red radiation and ultraviolet radiation.

Exemplary, non-limiting embodiments of the use of the resin formulation as defined above as a material for 3D printing will now be disclosed.

The 3D printing may be executed by any 3D printer that is suitable with the resin formulation as defined above. The printing technique may utilize Stereolithography, Digital Light Processing or PolyJet. The 3D printer may be Little RP printer. The 3D printer may be any printer that is of equivalence to the Little RP printer.

Exemplary, non-limiting embodiments of a three-dimensional printed article comprising the resin formulation as defined above, wherein said resin formulation is in a cured state will now be disclosed.

The 3D printed article may be any 3D objects that are of interest.

The initial colour tone of the 3D printed article may be light coloured or substantially colourless. Advantageously, a light coloured or substantially colourless 3D printed article may ensure good visibility for monitoring the colour change during photo-irradiation.

Exemplary, non-limiting embodiments of a method of tuning a colour of a three-dimensional printed article will now be disclosed. The method may comprise exposing a portion of the three-dimensional printed article as defined above with photo-irradiation. The photo-irradiation may utilize a light source selected from the group consisting of visible light, infra-red radiation and ultraviolet radiation.

The light source may be ultraviolet (UV) irradiation. The UV irradiation may have a light density of about 100 to about 300 cd·sr/m$^2$, or about 100 to about 250 cd·sr/m$^2$, or about 100 to about 200 cd·sr/m$^2$, or about 100 to about 150 cd·sr/m$^2$, or about 150 to about 300 cd·sr/m$^2$, or about 200 to about 300 cd·sr/m$^2$, or about 250 to about 300 cd·sr/m$^2$, or about 500 to about 700 cd·sr/m$^2$, or about 550 to about 700 cd·sr/m$^2$, or about 600 to about 700 cd·sr/m$^2$, or about 650 to about 700 cd·sr/m$^2$, or about 500 to about 650 cd·sr/m$^2$, or about 500 to about 600 cd·sr/m$^2$, or about 500 to about 550 cd·sr/m$^2$.

BRIEF DESCRIPTION OF DRAWINGS

The patent or application file contains at least one drawing executed in color. Copies of this patent or patent application publication with color drawing(s) will be provided by the Office upon request and payment of the necessary fee.

The accompanying drawings illustrate a disclosed embodiment and serves to explain the principles of the disclosed embodiment. It is to be understood, however, that the drawings are designed for purposes of illustration only, and not as a definition of the limits of the invention.

FIGS. 1A-1C show a number of 3D printed objects representing the Singapore national stadium having the size of a Singapore 50-cent coin (which has a diameter of 23 mm).

FIGS. 2A-2D show a number of 3D printed honeycomb objects with patterned designs or colour gradient designs.

FIGS. 3A-3B show a number of 3D printed honeycomb objects using photochromic resin (IMRE-O-R) orange (FIG. 3A) to red (FIG. 3B) after UV irradiation.

FIGS. 4A-4C depict a number of graphs that show the absorption spectrum (FIG. 4A), the rate of colouration (FIG. 4B) and the rate of de-colouration of photochromic resin (FIG. 4C) (IMRE-O-R).

FIGS. 5A-5B show a number of 3D printed honeycomb objects using photochromic resin (IMRE-Y-G) yellow (FIG. 5A) to green (FIG. 5B) after UV irradiation.

FIGS. 6A-6C depict a number of graphs that show the absorption spectrum (FIG. 6A), the rate of colouration (FIG. 6B) and the rate of de-colouration of photochromic resin (FIG. 6C) (IMRE-Y-G).

FIGS. 7A-7B show a number of 3D printed honeycomb objects using photochromic resin (IMRE-B-B) from brown (FIG. 7A) to dark blue (FIG. 7B) after UV irradiation.

FIGS. 8A-8C depict a number of graphs that show the absorption spectrum (FIG. 8A), the rate of colouration (FIG. 8B) and the rate of de-colouration of photochromic resin (FIG. 8C) (IMRE-B-B).

FIGS. 9A-9B show a number of 3D printed bracelets before UV irradiation (FIG. 9A) and after UV irradiation (FIG. 9B).

FIG. 10 shows a 3D printed bracelet that has been subjected to secondary printing of an "A*STAR" logo by photo-irradiation.

FIGS. 11A-11B show a spherical carbon 60 ball rested on a circular base with an "A*STAR" logo leaning on its right hand side before (FIG. 11A) and after UV irradiation (FIG. 11B).

FIGS. 12A-12E show a number of pictures depicting a 3D printed object after UV irradiation (FIG. 12A) and after exposure to ambient light for 5 minutes (FIG. 12B), 10 minutes (FIG. 12C), 15 minutes (FIG. 12D), and 20 minutes (FIG. 12E).

FIGS. 13A-13C show a number of images depicting 3D printed objects that were overly cured during the 3D printing process.

DETAILED DESCRIPTION OF DRAWINGS

Figure 1A:
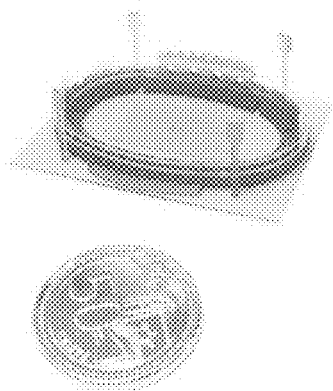
FIGS. 1A-1C
Figure 1B:
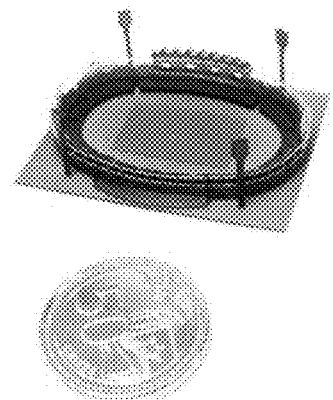
Figure 1C:
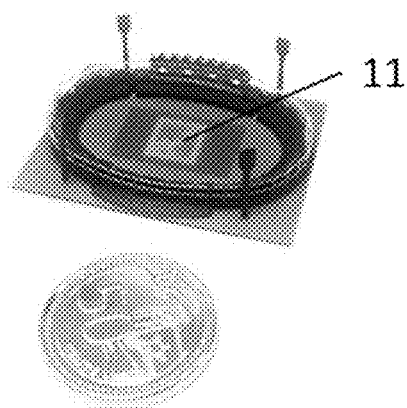

Referring to FIGS. 1A-1C, FIG. 1A is a yellow 3D printed object representing the Singapore national stadium prior to UV irradiation. FIG. 1B is a green 3D print of the Singapore national stadium after UV irradiation of the original yellow 3D print. FIG. 1C is a green 3D print of the Singapore national stadium after secondary printing of an "A*STAR" logo (11) in the centre of the object.

Figure 2A:
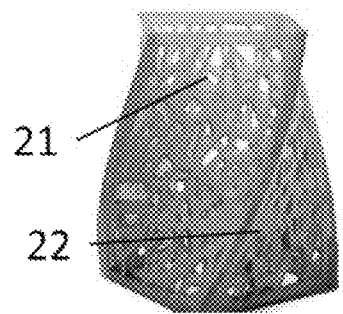
FIGS. 2A-2D
Figure 2B:
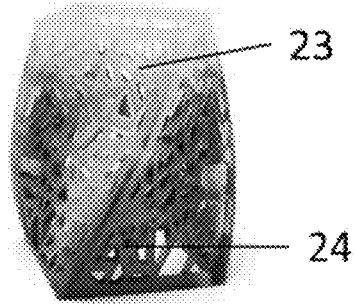
Figure 2C:
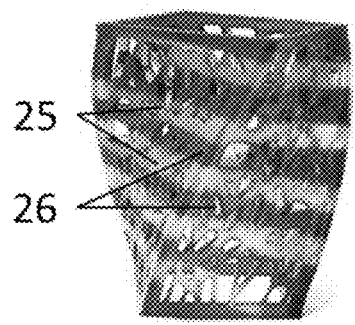
Figure 2D:
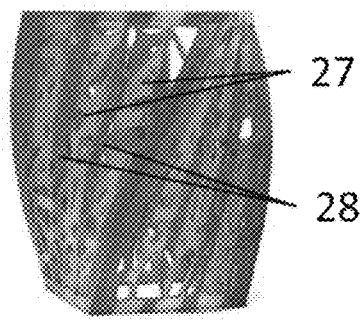

Referring to FIGS. 2A-2D, FIG. 2A shows an orange coloured 3D printed honeycomb object displaying gradient colour changes from orange (21) to red (22). FIG. 2B shows a green coloured 3D printed honeycomb object displaying gradient colour changes from yellow (23) to green (24). FIG. 2C shows a 3D printed honeycomb object displaying patterns of yellow (25) and green (26). FIG. 2D shows a 3D printed honeycomb object displaying patterns of orange (27) and red (28).

Figure 3A:
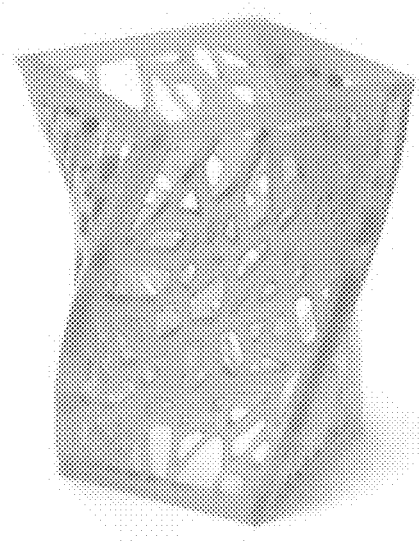
FIGS. 3A-3B
Figure 3B:
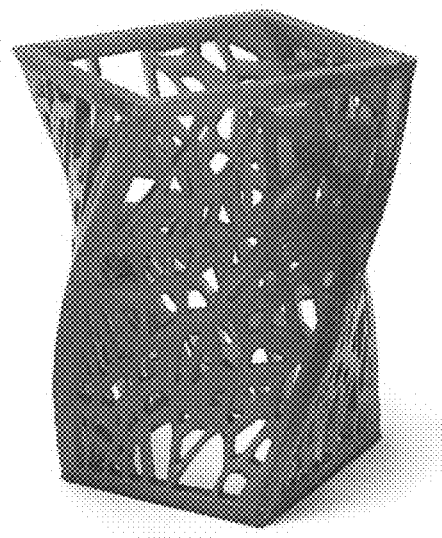

Referring to FIGS. 3A-3B, FIG. 3A shows the 3D honeycomb object printed using IMRE-O-R resin before UV irradiation and FIG. 3B shows the 3D honeycomb object after UV irradiation. In FIG. 3A, the object displayed an orange colour while in FIG. 3B, the object displayed a red colour.

Figure 4A:
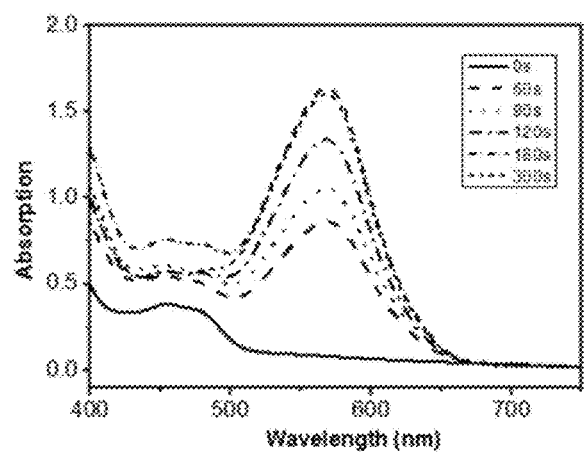
FIGS. 4A-4C
Figure 4B:
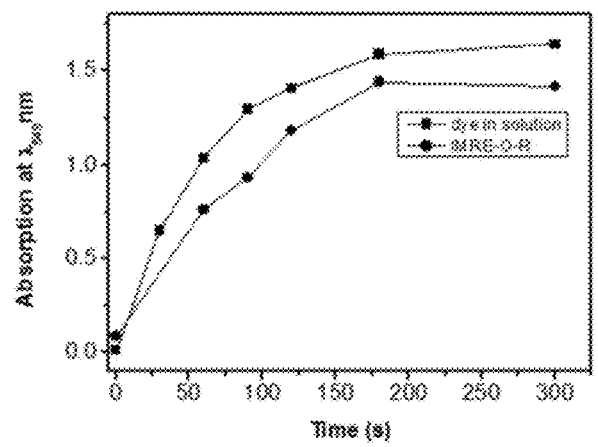
Figure 4C:
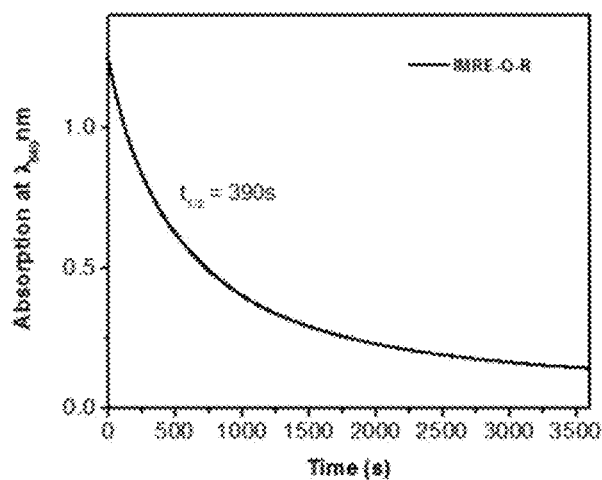

Referring to FIGS. 4A-4C, a thin film sample having a dimension of 10 by 30 by 0.1 mm was prepared using IMRE-O-R resin and 3D printer. FIG. 4A depicts the absorption spectrum of the thin film sample during 300 seconds of UV irradiation with an absorption peak observed at a wavelength of 549 nm. FIG. 4B depicts the rate of absorbance at 549 nm of the thin film sample prepared from IMRE-O-R resin in comparison with a sample dye in solution during 300 seconds of UV irradiation. FIG. 4C depicts the rate of absorbance at 549 nm of the thin film sample prepared from IMRE-O-R resin after the UV irradiation has stopped.

Figure 5A:
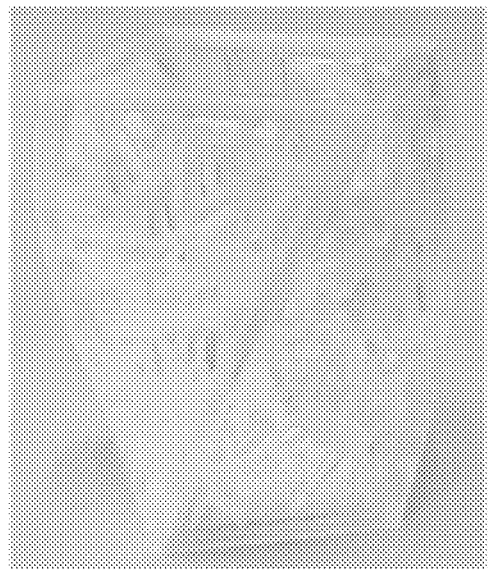
FIGS. 5A-5B
Figure 5B:
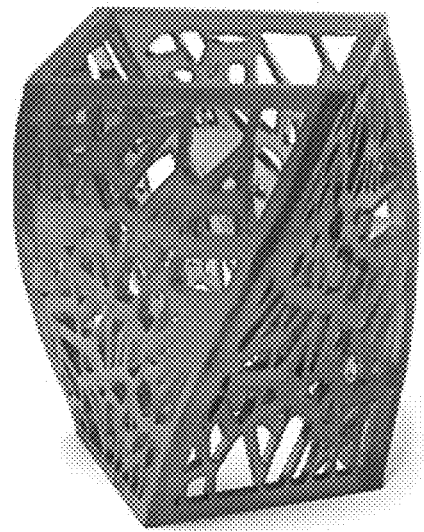

Referring to FIGS. 5A-5B, FIG. 5A shows the 3D honeycomb object printed using IMRE-Y-G resin before UV irradiation and FIG. 5B shows the 3D honeycomb object after UV irradiation.

In FIG. 5A, the object displayed a yellow colour while in FIG. 5B, the object displayed a green colour.

Figure 6A:
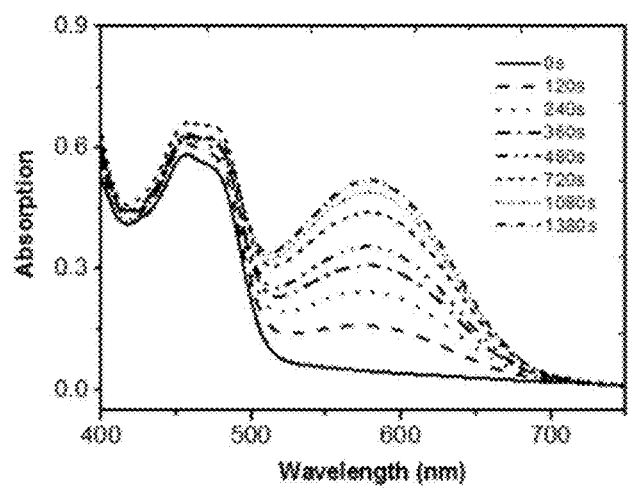
FIGS. 6A-6C
Figure 6B:
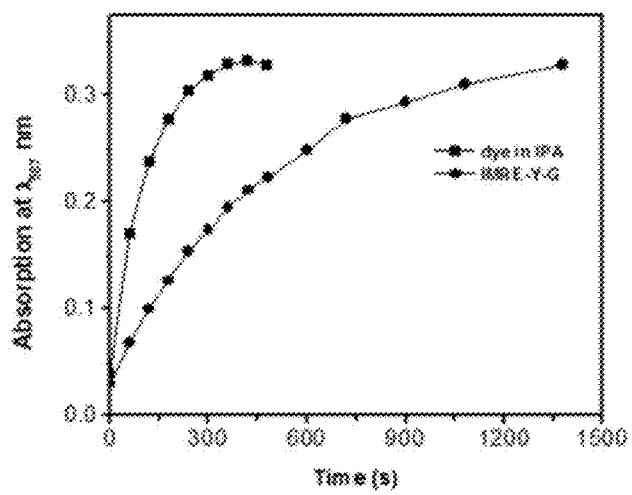
Figure 6C:
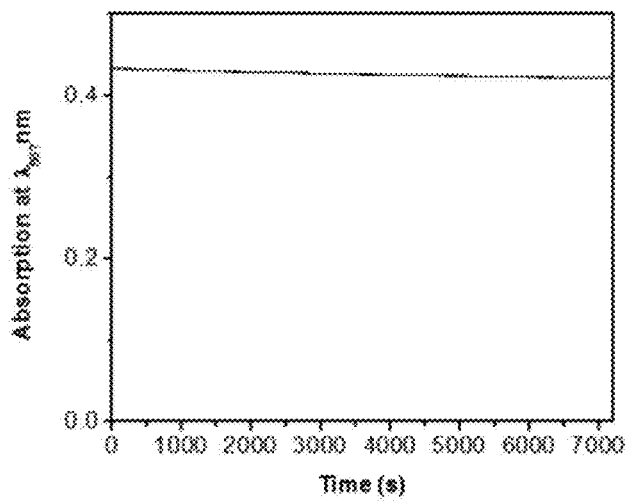

Referring to FIGS. 6A-6C, a thin film sample having a dimension of 10 by 30 by 0.1 mm was prepared using IMRE-Y-G resin and 3D printer. FIG. 6A depicts the absorption spectrum of the thin film sample during 1380 seconds of UV irradiation with an absorption peak observed at a wavelength of 567 nm. FIG. 6B depicts the rate of absorbance at 567 nm of the thin film sample prepared from IMRE-Y-G resin in comparison with a sample dye in solution during 1380 seconds of UV irradiation. FIG. 6C depicts the rate of absorbance at 567 nm of the thin film sample prepared from IMRE-Y-G resin after the UV irradiation has stopped.

Figure 7A:
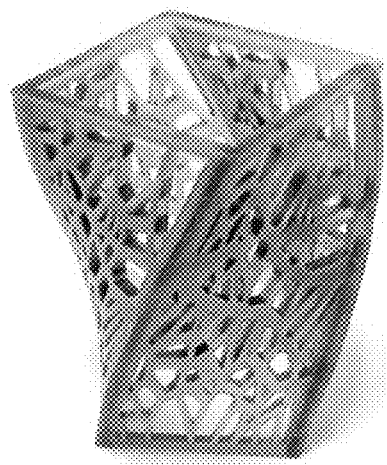
FIGS. 7A-7B
Figure 7B:
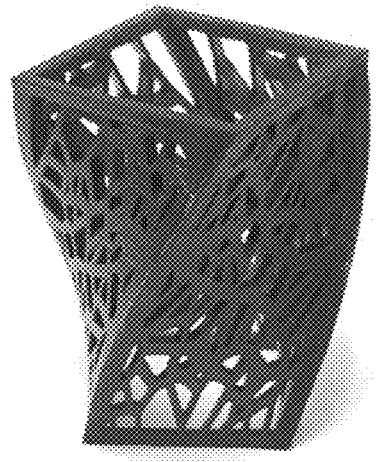

Referring to FIGS. 7A-7B, FIG. 7A shows the 3D honeycomb object printed using IMRE-B-B resin before UV irradiation and FIG. 7B shows the 3D honeycomb object after UV irradiation. In FIG. 7A, the object displayed a brown colour while in FIG. 7B, the object displayed a dark blue colour.

Figure 8A:
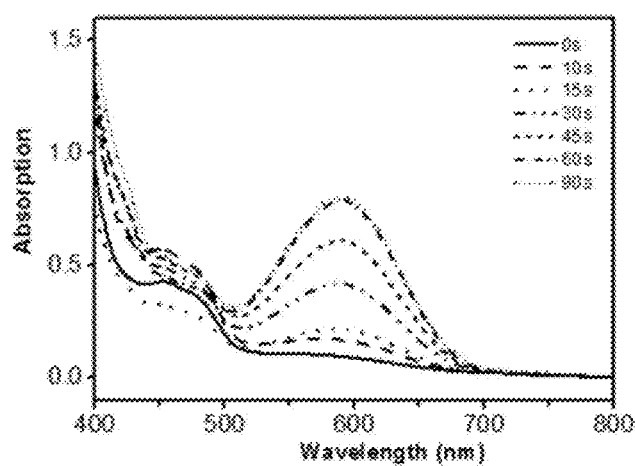
FIGS. 8A-8C
Figure 8B:
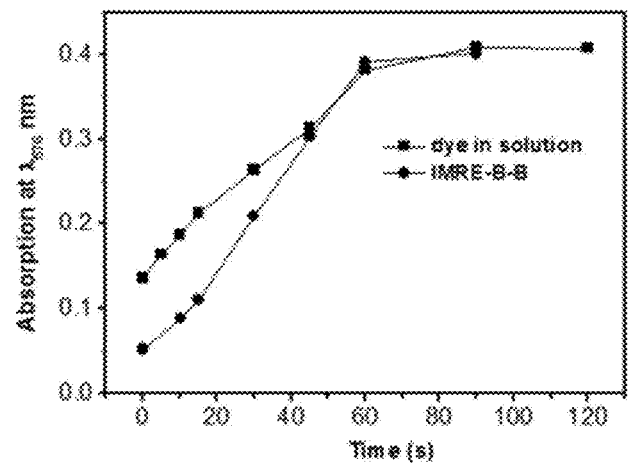
Figure 8C:
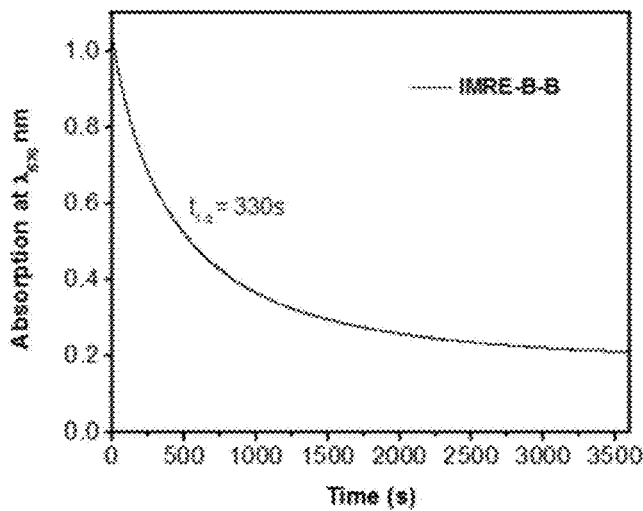

Referring to FIGS. 8A-8C, a thin film sample having a dimension of 10 by 30 by 0.1 mm was prepared using IMRE-B-B resin and 3D printer. FIG. 8A depicts the absorption spectrum of the thin film sample during 90 seconds of UV irradiation with an absorption peak observed at a wavelength of 576 nm. FIG. 8B depicts the rate of absorbance at 576 nm of the thin film sample prepared from IMRE-B-B resin in comparison with a sample dye in solution during 90 seconds of UV irradiation. FIG. 8C depicts the rate of absorbance at 576 nm of the thin film sample prepared from IMRE-B-B resin after the UV irradiation has stopped.

Figure 9A:
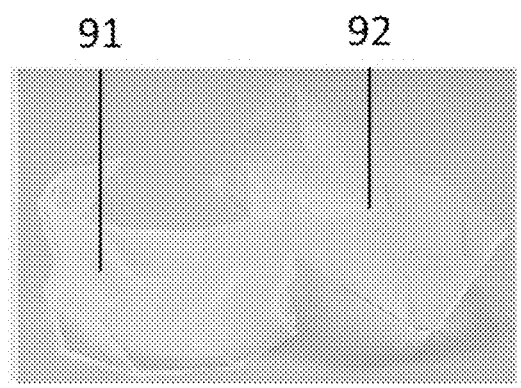
FIGS. 9A-9B
Figure 9B:
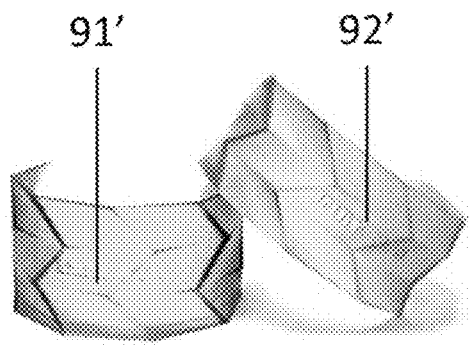

Referring to FIGS. 9A-9B, FIG. 9A shows the original yellow colour of 3D printed bracelets using the IMRE-Y-G resin (91) and the IMRE-O-R resin (92) prior to UV irradiation. FIG. 9B shows the final green (91') and red (92') colours of the 3D printed bracelets after UV irradiation.

Figure 10:
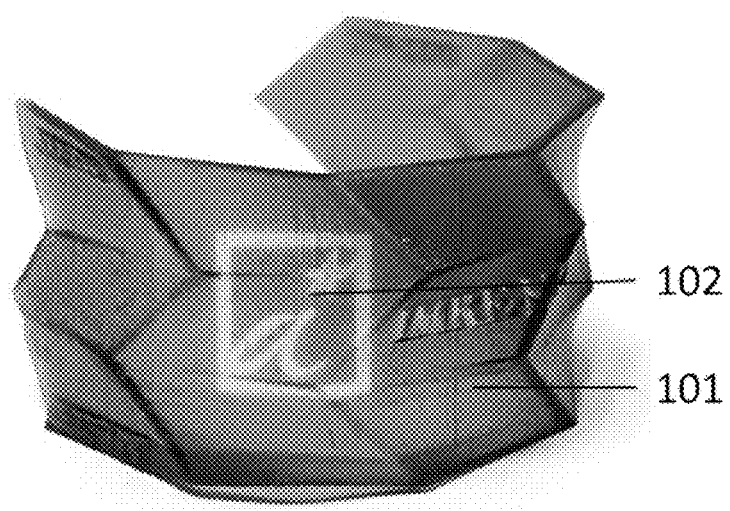
FIG. 10

Referring to FIG. 10, FIG. 10 shows the green 3D printed bracelet (101) after UV irradiation, which has been further printed with an "A*STAR" logo (102) in a lighter shade of green after exposing to secondary photo-irradiation.

Figure 11A:
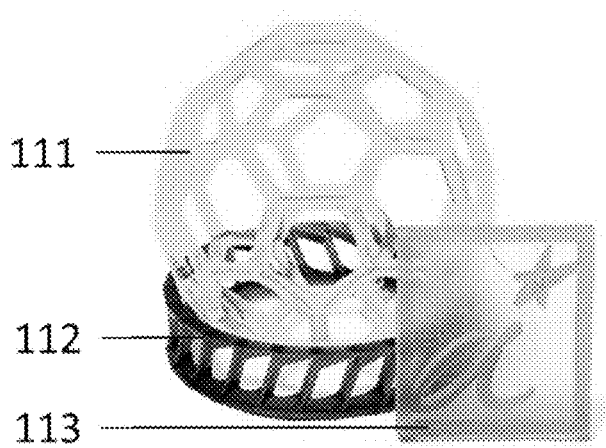
FIGS. 11A-11B
Figure 11B:
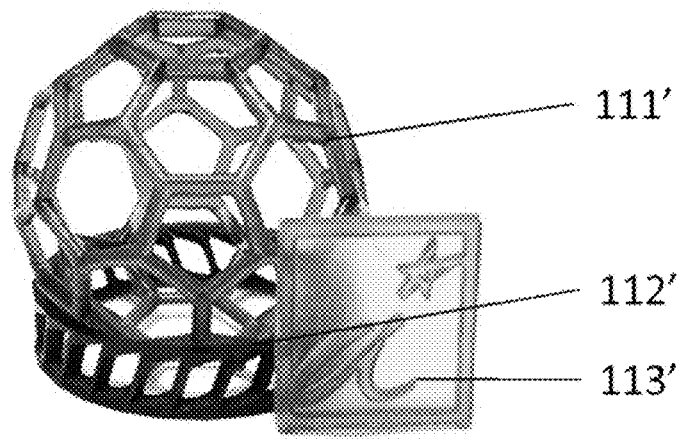

Referring to FIGS. 11A-11B, FIG. 11A shows a spherical carbon 60 ball (111) rested on a circular base (112) with an "A*STAR" logo (113) leaning on its right hand side. The spherical carbon 60 ball (111) was printed using IMRE-Y-G resin, the circular base (112) was printed using IMRE-B-B resin and the "A*STAR" logo (113) was printed using IMRE-O-R resin. FIG. 11B shows the objects after UV irradiation. As shown in FIG. 11B, the colour of the spherical carbon 60 ball (111') changed from original yellow to green, the colour of the circular base (112') changed from brown to dark blue and the colour of the "A*STAR" logo (113') changed from orange to red.

Figure 12A:
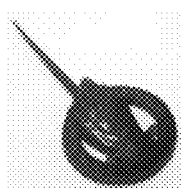
FIGS. 12A-12E
Figure 12B:
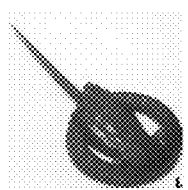
Figure 12C:
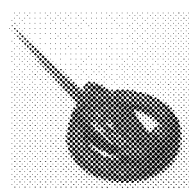
Figure 12D:
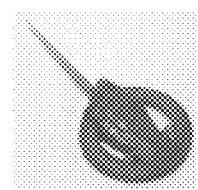
Figure 12E:
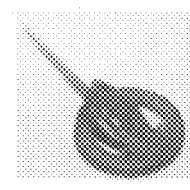

Referring to FIGS. 12A-12E, FIG. 12A shows a 3D printed object using IMRE-O-R resin after UV irradiation. The original colour was red and the object was left exposed to ambient light to observe the de-colouration process. Pictures were taken at 5 minute intervals. FIG. 12B shows the colour of the object after 5 minutes, FIG. 12C shows the colour of the object after 10 minutes, FIG. 12D shows the colour of the object after 15 minutes, and FIG. 12E shows the colour of the object after 20 minutes.

Figure 13A:
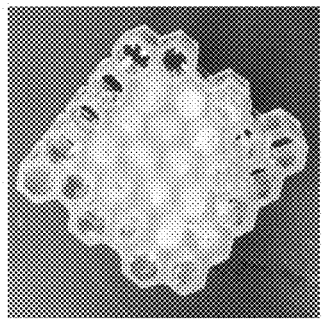
FIGS. 13A-13C
Figure 13B:
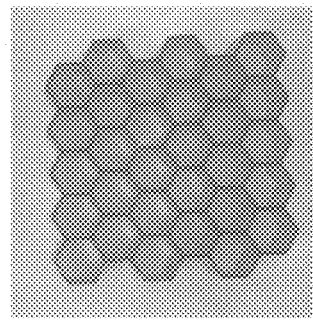
Figure 13C:
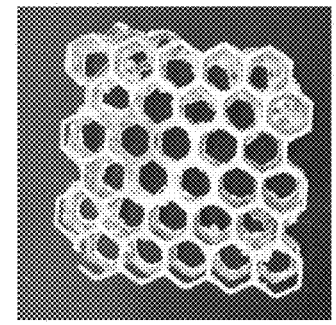

Referring to FIGS. 13A-13C, FIGS. 13A-13C show samples of 3D prints that are overly cured due to insufficient loading of photoabsorber in the resin formulation.

EXAMPLES

Non-limiting examples of the invention and a comparative example will be further described in greater detail by reference to specific Examples, which should not be construed as in any way limiting the scope of the invention.

Example 1

Materials and Methods

The DLP 3D printer for the resin test was LittleRP using a DLP projector (Brand & model: Acer P1283) as the light source and Creation Workshop as printing control software. Printing was carried out with slice thickness of 0.05 mm and five bottom layers to enhance the adhesion of printed parts on the printing platform. UV-Vis-NIR spectra were recorded on a Shimadzu model 2501-PC. Di(ethylene glycol) diacrylate (75%), 1,6-Hexanediol diacrylate (80%), phenylbis(2,4,6-trimethylbenzoyl)phosphine oxide (97%), Fluorescein (90%), 1',3'-Dihydro-1',3',3'-trimethyl-6-nitrospiro[2H-1-benzopyran-2,2'-(2H)-indole] (98%), were purchased from Sigma-Aldrich and used directly. 1,2-Bis(2,4-dimethyl-5-phenyl-3-thienyl)-3,3,4,4,5,5-hexafluoro-1-cyclopentene was purchased from Tokyo Chemical Industry and used directly.

Example 1

Preparation of Resin with Dynamic Color Change from Orange to Red and Corresponding 3D Printing (IMRE-O-R)

Di(ethylene glycol) diacrylate (84.3421 wt %), 1,6-Hexanediol diacrylate (14.8839 wt %), Phenylbis(2,4,6-trimethylbenzoyl)phosphine oxide (0.4961 wt %), Fluorescein (0.0298 wt %), and 1',3'-Dihydro-1',3',3'-trimethyl-6-nitrospiro[2H-1-benzopyran-2,2'-(2H)-indole] (0.2481 wt %) were weighted into a flask in sequence and stirred in the absence of light for 8 to 24 hours until all solid contents were dissolved. Ultrasonication may be used during mixing to help dissolve the solid contents.

3D printing using the IMRE-O-R resin was accomplished by using Stereo-lithography printing. The printing parameters were slice thickness: 0.050 mm; exposure time per layer: 2000 ms; and bottom layers exposure time: 3500 ms×5 layers. The final honeycomb object is shown in FIGS. 3A-3B. As shown in FIGS. 3A-3B, the colour of the 3D printed structure was observed to change from orange (FIG. 3A) to red (FIG. 3B) under Ultraviolet (UV) irradiation of 200 cd·sr/m² for 5 minutes.

Preparation of Resin with Dynamic Color Change from Yellow to Green and Corresponding 3D Printing (IMRE-Y-G)

Di(ethylene glycol) diacrylate (84.4679 wt %), 1,6-Hexanediol diacrylate (14.9061 wt %), Phenylbis(2,4,6-trimethylbenzoyl)phosphine oxide (0.4969 wt %), Fluorescein (0.0298 wt %), and 1,2-Bis(2,4-dimethyl-5-phenyl-3-thienyl)-3,3,4,4,5,5-hexafluoro-1-cyclopentene (0.0994 wt %) were weighted into a flask in sequence and stirred in the absence of light for 8 to 24 hours until all solid contents were dissolved. Ultrasonication may be used during mixing to help dissolve the solid contents.

3D printing using the IMRE-Y-G resin was accomplished by using Stereo-lithography printing. The printing parameters were slice thickness: 0.050 mm; exposure time per layer: 2000 ms; and bottom layers exposure time: 3500 ms×5 Layers. The final honeycomb object is shown in FIGS. 5A-5B. As shown in FIGS. 5A-5B, the colour of the 3D printed structure was observed to change from yellow (FIG. 5A) to green (FIG. 5B) under UV irradiation of 200 cd·sr/m² for 5 minutes.

Preparation of Resin with Dynamic Color Change from Brown to Dark Blue and Corresponding 3D Printing (IMRE-B-B)

Di(ethylene glycol) diacrylate (84.3924 wt %), 1,6-Hexanediol diacrylate (14.8928 wt %), Phenylbis(2,4,6-trimethylbenzoyl)phosphine oxide (0.4964 wt %), Fluorescein (0.0199 wt %), and 1',3'-Dihydro-1',3',3'-trimethyl-6-nitrospiro[2H-1-benzopyran-2,2'-(2H)-indole] (0.1986 wt %) were weighted into a flask in sequence and stirred in the absence of light for 8 to 24 hours until all solid contents were dissolved. Ultrasonication may be used during mixing to help dissolve the solid contents.

3D printing using the IMRE-B-B resin was accomplished by using Stereo-lithography printing. The printing parameters were slice thickness: 0.050 mm; exposure time per layer: 2000 ms; and bottom layers exposure time: 3500 ms×5 Layers. The final honeycomb object is shown in FIGS. 7A-7B. As shown in FIGS. 7A-7B, the colour of the 3D printed structure was observed to change from brown (FIG. 7A) to dark blue (FIG. 7B) under UV irradiation of 200 cd·sr/m² for 5 minutes.

Example 2

Dynamic Colour Change Analysis of IMRE-O-R

Dynamic color changes were analyzed on a UV-vis-NIR spectrometer. A UV-reactor with major irradiation centered at 350 nm was used as UV light source. The samples were monitored at their maximum absorbance of the colored form (549 nm) for a period of 300 seconds. The de-colouration was then monitored for a maximum of 3500 seconds. The results are shown in FIGS. 4A-4C.

Dynamic Colour Change Analysis of IMRE-Y-G

Dynamic color changes were analyzed on a UV-vis-NIR spectrometer. A UV-reactor with major irradiation centered at 350 nm was used as UV light source. The samples were monitored at their maximum absorbance of the colored form (567 nm) for a period of 1380 seconds. The de-colouration was then monitored for a maximum of 7000 seconds. The results are shown in FIGS. 6A-6C.

Dynamic Colour Change Analysis of IMRE-B-B

Dynamic color changes were analyzed on a UV-vis-NIR spectrometer. A UV-reactor with major irradiation centered at 350 nm was used as UV light source. The samples were monitored at their maximum absorbance of the colored form (567 nm) for a period of 1380 seconds. The de-colouration was then monitored for a maximum of 7000 seconds. The results are shown in FIGS. 8A-8C.

Example 3

3D Printing of a Bracelet with Dynamic Colour Change Properties 3D printing of a bracelet with dynamic colour change ability using a photochromic resin was performed. To prepare the photochromic resin, Di(ethylene glycol) diacrylate (84.3924 wt %), 1,6-Hexanediol diacrylate (14.8928 wt %), Phenylbis(2,4,6-trimethylbenzoyl)phosphine oxide (0.4964 wt %), Fluorescein (0.0199 wt %), and 1',3'-Dihydro-1',3',3'-trimethyl-6-nitrospiro[2H-1-benzopyran-2,2'-(2H)-indole] (0.1986 wt %) were weighted into a flask in sequence and stirred in the absence of light for 8-24 h until all solid contents were dissolved. Ultrasonication may be used during mixing to help dissolve the solid contents.

3D printing using the resin as prepared above was accomplished by using Stereo-lithography printing. The printing parameters were slice thickness: 0.050 mm; exposure time per layer: 1600 ms; and bottom layers exposure time: 2500 ms×5 Layers. The final 3D printed bracelet is shown in FIG. 9A. As shown in FIG. 9B, the colour of the printed bracelet changed from the original yellow to green under UV irradiation of 200 cd·sr/m² for 1 minute.

Secondary Printing onto the 3D Printed Bracelet

Secondary printing of an "A*STAR" logo onto the 3D printed bracelet was performed. Visible light pattern of the "A*STAR" logo was generated by a computer-controlled DLP projector and projected on the colored bracelet (green color) for 20 seconds (light density: 1250 K cd·sr/m²). As shown in FIG. 10, the resultant logo having a lighter colour tone was printed onto the bracelet.

Example 4

3D Printing of a Carbon 60 Ball, an "A*STAR" Logo with Dynamic Colour Change Properties 3D printing of a carbon 60 ball and an "A*STAR" logo was performed. Resin IMRE-O-R and its respective printing parameters of Example 1 were used in the printing of the "A*STAR" logo and resin IMRE-Y-G and its respective printing parameters of Example 1 were used in the printing of the carbon 60 ball. The base for supporting the printed carbon 60 ball was printed using resin IMRE-B-B and its respective printing parameters of Example 1. The printed objects are shown in FIG. 11A. The objects were subsequently exposed to UV irradiation using the parameters in Example 1 and the results are shown in FIG. 11B.

Example 5

Demonstration of De-Colouration Process of Photochromic Resin

Demonstration of dynamic de-coloring process of a 3D printed object investigated. Resin IMRE-O-R and its respective printing parameters of Example 1 were used in the printing of the 3D printed object shown in FIG. 12A. The printed object was first irradiated under UV light at 365 nm with light density of 693 cd·sr/m² for 2 min and left at ambient conditions to observe the de-colouration process. Images shown in FIGS. 12B-12E were obtained at 5-minute intervals.

INDUSTRIAL APPLICABILITY

The resin formulation of the present disclosure may be applied in jewelry design, fashion design, souvenirs, UV indicators, optically modulated sensors, smart windows, display indicators, or packaging indicators. For example, the resin formulation may be applied on the designs of clothing which can change colour depending on the exposure to UV radiation from the sun. Similarly, the resin formulation may be applied on photochromic lenses for outdoor equipment.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

What is claimed is:

1. A resin formulation comprising:
    a) a base acrylate monomer or oligomer;
    b) a solubilizing acrylate monomer or oligomer comprising a functional group selected from the group consisting of alkyl, hydroxyl, alkoxyl, carboxylic acid, amine, alkylamine, amide, alkylamide, alkylacrylate, acrylate and heterocycloalkyl, wherein the solubilizing acrylate monomer is selected from the group consisting of 2-carboxyethyl acrylate, 3-carboxypropyl acrylate, 4-carboxybutyl acrylate, 1,3-propanediol diacrylate, 1,4-butanediol diacrylate, 1,5-pentanediol diacrylate, tetrahydrofurfuryl methacrylate, 2-tetrahydropyranyl acrylate, 2-[[(Butylamino)carbonyl]oxy]ethyl acrylate, 4-tert-Butylcyclohexyl methacrylate, Ethyl triglycol methacrylate, and 3,3,5-trimethylcyclohexanol methacrylate;
    c) a photoinitiator compound;
    d) a photoabsorber compound selected from the group consisting of 1-phenylazo-2-naphthol (sudan I), 1-(2,4-dimethylphenylazo)-2-naphthol (sudan II), 1-(4-(phenyldiazenyl)phenyl) azonaphthalen-2-ol (sudan III), 1-[{2-methyl-4-[(2-methylphenyl)diazenyl]phenyl}diazenyl]naphthalen-2-ol (sudan IV), 2,5-bis(5-tert-butyl-benzoxazol-2-yl)thiophene, 4-methoxyphenol and butylatedhydroxytoluene, Fluorescein, Poly(3-hexylthiophene-2,5-diyl), oligothiophenes, triphenylamines, diketopyrrolopyrroles derivatives, 2,5-Dihydro-3,6-di-2-thienyl-pyrrolo[3,4-c]pyrrole-1,4-dione, borondipyrromethenes derivatives, 1,3,5,7-Tetramethyl-8-phenyl-4,4-difluoroboradiazaindacene, 2,2'-(2,5-thiophenediyl)bis(5-tert-butylbenzoxazole), (±)-α-Tocopherol, 2-Phenyl-2H-benzotriazole derivatives, and indigo dye; and
    e) a photochromic dye.

2. The resin formulation of claim 1, wherein the base acrylate monomer is of formula (Ia), (Ib), (Ic) or (Id):

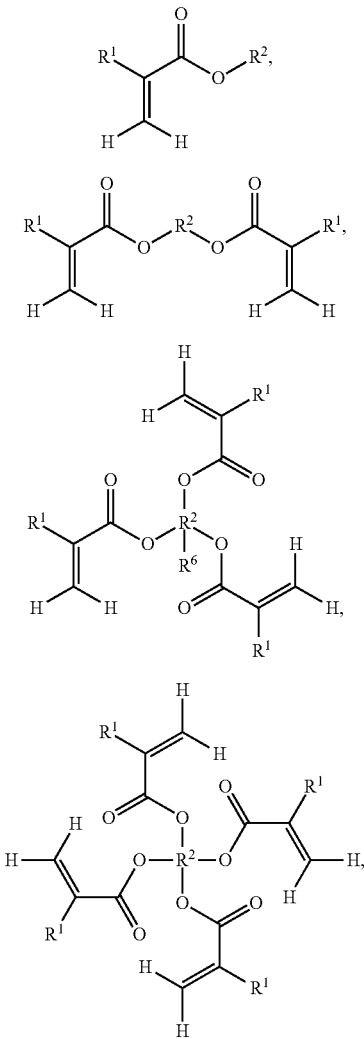

wherein
R¹ is hydrogen or an alkyl group;
R² in formula (Ia), (Ib) or (Ic) is independently an optionally substituted alkyl group, an optionally substituted arylalkyl group, an optionally substituted alkoxyl group, an optionally substituted arylalkoxyl group, an optionally substituted alkylamine group, an optionally substituted arylalkylamine group, an optionally substituted alkylsilane group, an optionally substituted arylalkylsilane group, an optionally substituted alkylcarboxylic acid group, an optionally substituted arylalkylcarboxylic acid group, an optionally substituted ester group, an optionally substituted carbonyl group, an optionally substituted alkylether group, an optionally substituted cycloalkyl group, or an optionally substituted arylalkylether group;
R² in formula (Id) is a carbon atom or an optionally substituted alkyl group; or
R⁶ in formula (Ic) is hydrogen or a hydroxyl group.

3. The resin formulation of claim 1, wherein the base acrylate monomer is selected from the group consisting of poly(ethylene glycol) diacrylate, di(ethylene glycol) diacrylate, tri(ethylene glycol) diacrylate, tetra(ethylene glycol) diacrylate, di(ethylene glycol) dimethacrylate, 1,3-Butanediol diacrylate, 1,6-Hexanediol diacrylate, Bisphenol A ethoxylate diacrylate, Trimethylolpropane triacrylate, Pentaerythritol triacrylate, Di(trimethylolpropane) tetraacrylate, and Pentaerythritol tetraacrylate.

4. The resin formulation of claim 1, wherein the photochromic dye comprises an organic dye, an inorganic compound or a combination thereof.

5. The resin formulation of claim 4, wherein the organic dye is selected from the group consisting of Spiropyrans, spirooxazines, 1',3'-Dihydro-1',3',3'-trimethyl-6-nitrospiro[2H-1-benzopyran-2,2'-(2H)-indole], 1-(2-Hydroxyethyl)-3,3-dimethylindolino-6'-nitrobenzopyrylospiran, 1,3,3-Trimethylindolinobenzopyrylospiran, 1,3,3-Trimethylindolino-6'-nitrobenzopyrylospiran, 1,3,3-Trimethylindolino-6'-bromobenzopyrylospiran, 1,3,3-Trimethylindolino-8'-methoxybenzopyrylospiran, 1,3,3-Trimethylindolino-β-naphthopyrylospiran, 1,3,3-Trimethylindolinonaphthospirooxazine, diarylethenes, 2,3-Bis(2,4,5-trimethyl-3-thienyl)maleic Anhydride, 2,3-Bis(2,4,5-trimethyl-3-thienyl)maleimide, cis-1,2-Dicyano-1,2-bis(2,4,5-trimethyl-3-thienyl)ethene, 1,2-Bis[2-methylbenzo[b]thiophen-3-yl]-3,3,4,4,5,5-hexafluoro-1-cyclopentene, 1,2-Bis(2,4-dimethyl-5-phenyl-3-thienyl)-3,3,4,4,5,5-hexafluoro-1-cyclopentene, spiroperimidines, 2,3-Dihydro-2-spiro-4'-[8'-aminonaphthalen-1'(4'H)-one]perimidine, 2,3-Dihydro-2-spiro-7'-[8'-imino-7',8'-dihydronaphthalen-1'-amine]perimidine; (E)-3-(Adamantan-2-ylidene)-4-[1-(2,5-dimethyl-3-furyl)ethylidene]dihydro-2,5-furandione (Aberchrome 670), 2,2'-Bis(2-chlorophenyl)-4,4',5,5'-tetraphenyl-1,2'-biimidazole, 4-[Bis(9,9-dimethylfluoren-2-yl)amino]azobenzene, 1,1'-Dibenzyl-4,4'-bipyridinium dichloride, 4,4'-Dipyridyl.

6. The resin formulation of claim 4, wherein the inorganic compound is selected from the group consisting of silver chloride, zinc halides and yttrium hydride.

7. The resin formulation of claim 1, wherein the photoinitiator compound is selected from the group consisting of Phenylbis(2,4,6-trimethylbenzoyl)phosphine oxide (IRGACURE 819), benzoyl-diphenylphosphine oxide (BDPO), 2,4,6-trimethylbenzoyl-methoxy-phenylphosphine oxide (TMMPO), 2,4,6-trimethylbenzoyldiphenyl phosphine (TPO), 2-hydroxy-2-methyl-1-phenyl-1-propane (DAROCUR 1173), benzophenone (BP), 4,4'-bis(diethylamino)benzophenone, phenanthrenequinone, 2-chlorothioxanthen-9-one, 4,4'-bis(dimethylamino)-benzophenone, diphenyliodonium hexafluorophosphate, (4-tert-butylphenyl)diphenylsulfonium triflate, diphenyliodonium nitrate, diphenyliodonium p-toluenesulfonate, (4-fluorophenyl)diphenylsulfonium triflate, triphenylsulfonium triflate and bis(4-tert-butylphenyl)iodonium trifluoromethanesulfonate (DtBPIT).

8. The resin formulation of claim 1, comprising 70 to 90 wt % of the base acrylate monomer, 9.8 to 20 wt % of the solubilizing acrylate monomer, 0.1 to 5 wt % of the photoinitiator, 0.01 to 0.5 wt % of the photoabsorber compound, and 0.09 to 4.5 wt % of the photochromic dye based on the total weight of the resin formulation.

9. A method of preparing a resin formulation comprising:
a) a base acrylate monomer or oligomer;
b) a solubilizing acrylate monomer or oligomer comprising a functional group selected from the group consisting of alkyl, hydroxyl, alkoxyl, carboxylic acid, amine, alkylamine, amide, alkylamide, alkylacrylate, acrylate and heterocycloalkyl, wherein the solubilizing acrylate monomer is selected from the group consisting of 2-carboxyethyl acrylate, 3-carboxypropyl acrylate, 4-carboxybutyl acrylate, 1,3-propanediol diacrylate, 1,4-butanediol diacrylate, 1,5-pentanediol diacrylate, tetrahydrofurfuryl methacrylate, 2-tetrahydropyranyl acrylate, 2-[[(Butylamino)carbonyl]oxy]ethyl acrylate, 4-tert-Butylcyclohexyl methacrylate, Ethyl triglycol methacrylate, and 3,3,5-trimethylcyclohexanol methacrylate;

c) a photoinitiator compound;

d) a photoabsorber compound selected from the group consisting of 1-phenylazo-2-naphthol (sudan I), 1-(2,4-dimethylphenylazo)-2-naphthol (sudan II), 1-(4-(phenyldiazenyl)phenyl) azonaphthalen-2-ol (sudan III), 1-[{2-methyl-4-[(2-methylphenyl)diazenyl]phenyl}diazenyl]naphthalen-2-ol (sudan IV), 2,5-bis(5-tert-butyl-benzoxazol-2-yl)thiophene, 4-methoxyphenol and butylatedhydroxytoluene, Fluorescein, Poly(3-hexylthiophene-2,5-diyl), oligothiophenes, triphenylamines, diketopyrrolopyrroles derivatives, 2,5-Dihydro-3,6-di-2-thienyl-pyrrolo[3,4-c]pyrrole-1,4-dione, borondipyrromethenes derivatives, 1,3,5,7-Tetramethyl-8-phenyl-4,4-difluoroboradiazaindacene, 2,2'-(2,5-thiophenediyl)bis(5-tert-butylbenzoxazole), (±)-α-Tocopherol, 2-Phenyl-2H-benzotriazole derivatives, and indigo dye; and e) a photochromic dye;

wherein the method comprises:
stirring a base acrylate monomer, a solubilizing acrylate monomer, a photoinitiator compound, a photoabsorber compound and a photochromic dye in the absence of light for a period of time to form a reaction mixture; and
optionally ultrasonicating the reaction mixture.

10. A method for producing a three-dimensional photochromic object comprising exposing a resin formulation to a light source, wherein the resin formation comprises:

a) a base acrylate monomer or oligomer;

b) a solubilizing acrylate monomer or oligomer comprising a functional group selected from the group consisting of alkyl, hydroxyl, alkoxyl, carboxylic acid, amine, alkylamine, amide, alkylamide, alkylacrylate, acrylate and heterocycloalkyl, wherein the solubilizing acrylate monomer is selected from the group consisting of 2-carboxyethyl acrylate, 3-carboxypropyl acrylate, 4-carboxybutyl acrylate, 1,3-propanediol diacrylate, 1,4-butanediol diacrylate, 1,5-pentanediol diacrylate, tetrahydrofurfuryl methacrylate, 2-tetrahydropyranyl acrylate, 2-[[(Butylamino)carbonyl]oxy]ethyl acrylate, 4-tert-Butylcyclohexyl methacrylate, Ethyl triglycol methacrylate, and 3,3,5-trimethylcyclohexanol methacrylate;

c) a photoinitiator compound;

d) a photoabsorber compound selected from the group consisting of 1-phenylazo-2-naphthol (sudan I), 1-(2,4-dimethylphenylazo)-2-naphthol (sudan II), 1-(4-(phenyldiazenyl)phenyl) azonaphthalen-2-ol (sudan III), 1-[{2-methyl-4-[(2-methylphenyl)diazenyl]phenyl}diazenyl]naphthalen-2-ol (sudan IV), 2,5-bis(5-tert-butyl-benzoxazol-2-yl)thiophene, 4-methoxyphenol and butylatedhydroxytoluene, Fluorescein, Poly(3-hexylthiophene-2,5-diyl), oligothiophenes, triphenylamines, diketopyrrolopyrroles derivatives, 2,5-Dihydro-3,6-di-2-thienyl-pyrrolo[3,4-c]pyrrole-1,4-dione, borondipyrromethenes derivatives, 1,3,5,7-Tetramethyl-8-phenyl-4,4-difluoroboradiazaindacene, 2,2'-(2,5-thiophenediyl)bis(5-tert-butylbenzoxazole), (±)-α-Tocopherol, 2-Phenyl-2H-benzotriazole derivatives, and indigo dye; and e) a photochromic dye.

11. The method of claim 10, wherein the light source is selected from the group consisting of visible light, infra-red radiation and ultraviolet radiation.

12. A three-dimensional printed article comprising a resin formulation comprising:

a) a base acrylate monomer or oligomer;

b) a solubilizing acrylate monomer or oligomer comprising a functional group selected from the group consisting of alkyl, hydroxyl, alkoxyl, carboxylic acid, amine, alkylamine, amide, alkylamide, alkylacrylate, acrylate and heterocycloalkyl, wherein the solubilizing acrylate monomer is selected from the group consisting of 2-carboxyethyl acrylate, 3-carboxypropyl acrylate, 4-carboxybutyl acrylate, 1,3-propanediol diacrylate, 1,4-butanediol diacrylate, 1,5-pentanediol diacrylate, tetrahydrofurfuryl methacrylate, 2-tetrahydropyranyl acrylate, 2-[[(Butylamino)carbonyl]oxy]ethyl acrylate, 4-tert-Butylcyclohexyl methacrylate, Ethyl triglycol methacrylate, and 3,3,5-trimethylcyclohexanol methacrylate;

c) a photoinitiator compound;

d) a photoabsorber compound selected from the group consisting of 1-phenylazo-2-naphthol (sudan I), 1-(2,4-dimethylphenylazo)-2-naphthol (sudan II), 1-(4-(phenyldiazenyl)phenyl) azonaphthalen-2-ol (sudan III), 1-[{2-methyl-4-[(2-methylphenyl)diazenyl]phenyl}diazenyl]naphthalen-2-ol (sudan IV), 2,5-bis(5-tert-butyl-benzoxazol-2-yl)thiophene, 4-methoxyphenol and butylatedhydroxytoluene, Fluorescein, Poly(3-hexylthiophene-2,5-diyl), oligothiophenes, triphenylamines, diketopyrrolopyrroles derivatives, 2,5-Dihydro-3,6-di-2-thienyl-pyrrolo[3,4-c]pyrrole-1,4-dione, borondipyrromethenes derivatives, 1,3,5,7-Tetramethyl-8-phenyl-4,4-difluoroboradiazaindacene, 2,2'-(2,5-thiophenediyl)bis(5-tert-butylbenzoxazole), (±)-α-Tocopherol, 2-Phenyl-2H-benzotriazole derivatives, and indigo dye; and e) a photochromic dye;

wherein said resin formulation is in a cured state.

13. A method of tuning a colour of a three-dimensional printed article comprising exposing a portion of the three-dimensional printed article with photo-irradiation, wherein the three-dimensional printed article comprises a resin formulation comprising:

a) a base acrylate monomer or oligomer;

b) a solubilizing acrylate monomer or oligomer comprising a functional group selected from the group consisting of alkyl, hydroxyl, alkoxyl, carboxylic acid, amine, alkylamine, amide, alkylamide, alkylacrylate, acrylate and heterocycloalkyl, wherein the solubilizing acrylate monomer is selected from the group consisting of 2-carboxyethyl acrylate, 3-carboxypropyl acrylate, 4-carboxybutyl acrylate, 1,3-propanediol diacrylate, 1,4-butanediol diacrylate, 1,5-pentanediol diacrylate, tetrahydrofurfuryl methacrylate, 2-tetrahydropyranyl acrylate, 2-[[(Butylamino)carbonyl]oxy]ethyl acrylate, 4-tert-Butylcyclohexyl methacrylate, Ethyl triglycol methacrylate, and 3,3,5-trimethylcyclohexanol methacrylate;

c) a photoinitiator compound;

d) a photoabsorber compound selected from the group consisting of 1-phenylazo-2-naphthol (sudan I), 1-(2,4-dimethylphenylazo)-2-naphthol (sudan II), 1-(4-

(phenyldiazenyl)phenyl) azonaphthalen-2-ol (sudan III), 1-[{2-methyl-4-[(2-methylphenyl)diazenyl]phenyl}diazenyl]naphthalen-2-ol (sudan IV), 2,5-bis(5-tert-butyl-benzoxazol-2-yl)thiophene, 4-methoxyphenol and butylatedhydroxytoluene, Fluorescein, Poly(3-hexylthiophene-2,5-diyl), oligothiophenes, triphenylamines, diketopyrrolopyrroles derivatives, 2,5-Dihydro-3,6-di-2-thienyl-pyrrolo[3,4-c]pyrrole-1,4-dione, borondipyrromethenes derivatives, 1,3,5,7-Tetramethyl-8-phenyl-4,4-difluoroboradiazaindacene, 2,2'-(2,5-thiophenediyl)bis(5-tert-butylbenzoxazole), (±)-α-Tocopherol, 2-Phenyl-2H-benzotriazole derivatives, and indigo dye; and e) a photochromic dye;

wherein said resin formulation is in a cured state.

14. The method of claim 13, wherein the photo-irradiation is irradiation with a light source selected from the group consisting of visible light, infra-red radiation and ultraviolet radiation.

\* \* \* \* \*